Figure 11:
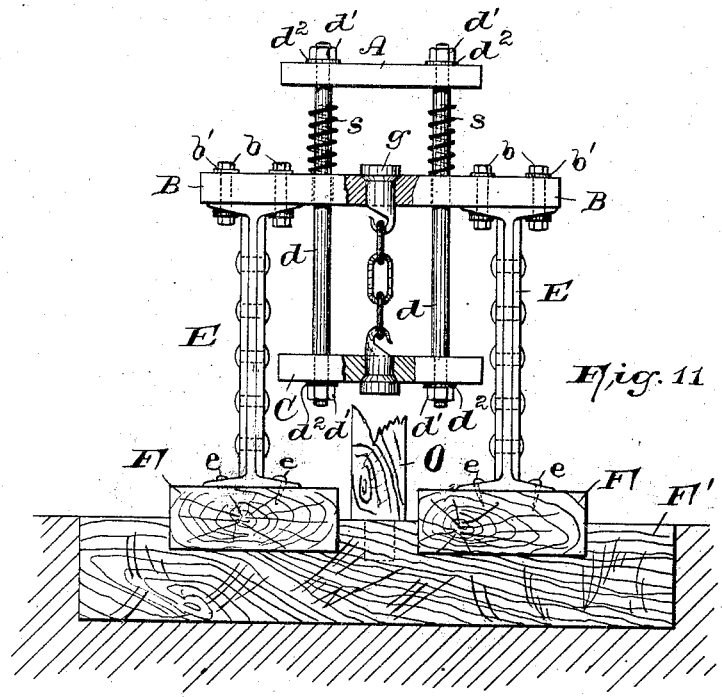

(No Model.) 5 Sheets—Sheet 1.
E. D. ESTRADA.
MACHINE FOR TESTING THE STRENGTH OF METALS, &c.
No. 463,259. Patented Nov. 17, 1891.
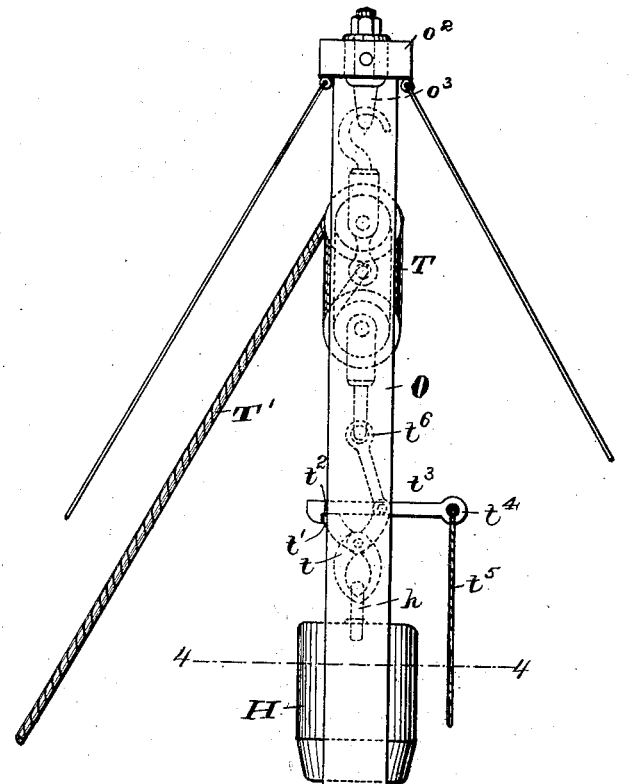
Fig. 1
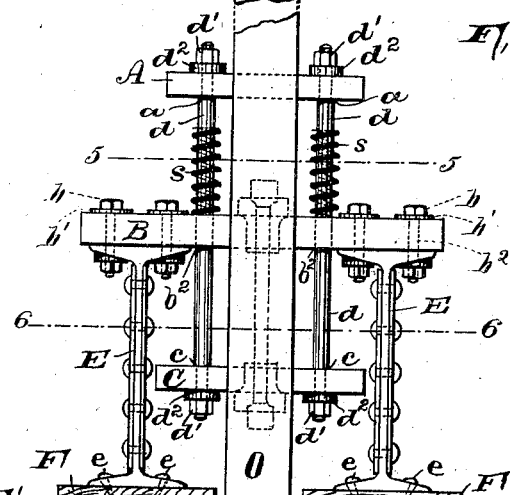
WITNESSES:
Wm. H. Camfield.
Arthur Crisse
INVENTOR:
Esteban D. Estrada,
BY Fred'k C. Fraentzel, ATT'Y.

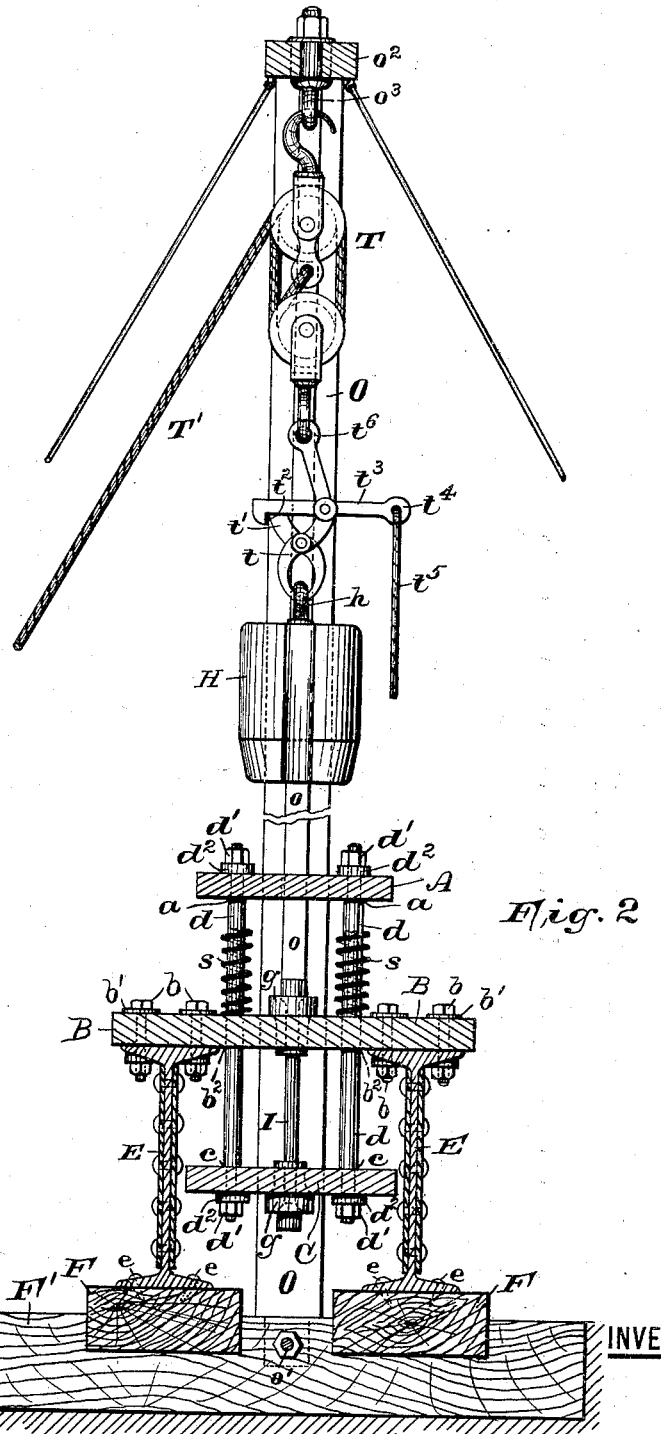

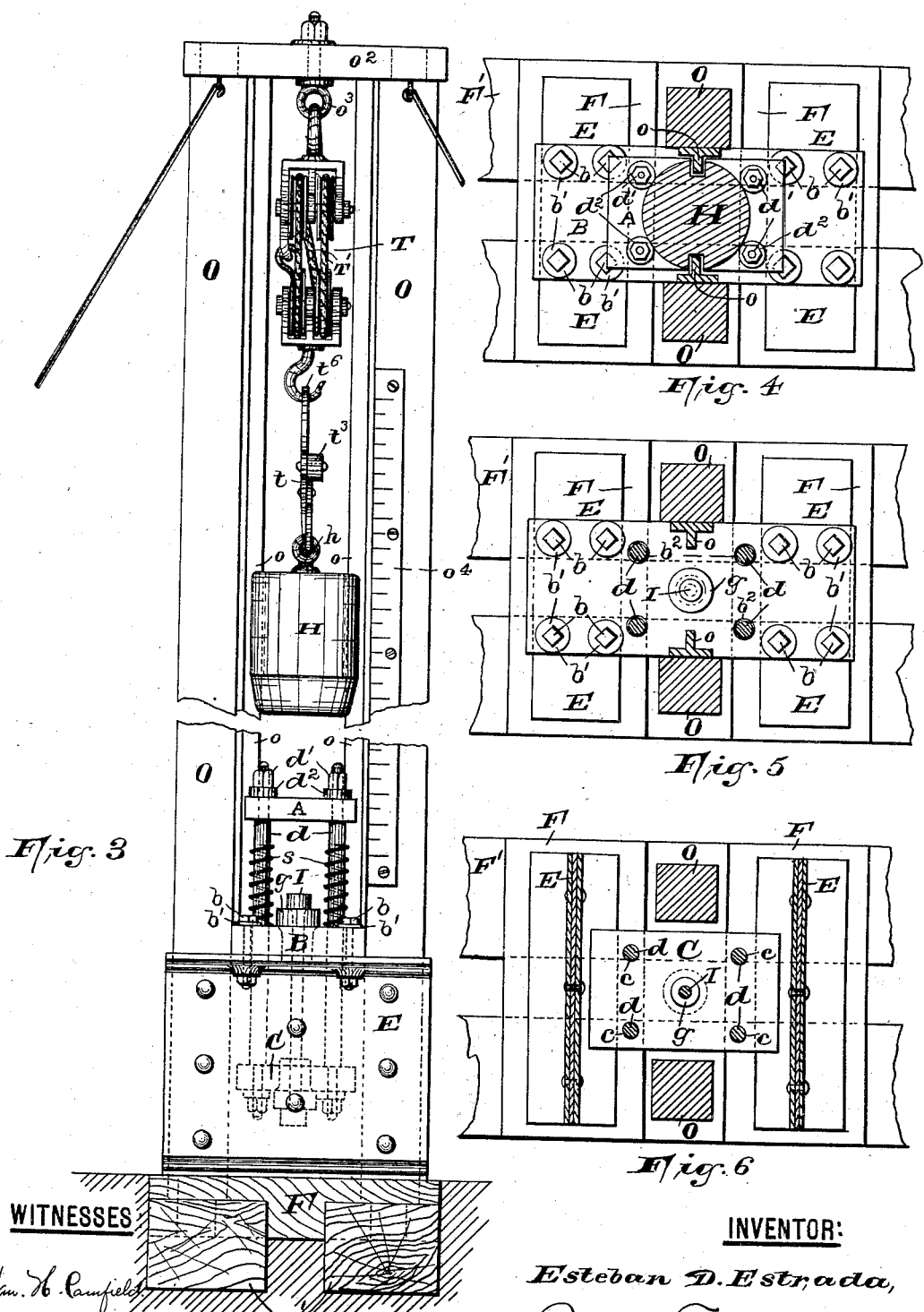

(No Model.)
E. D. ESTRADA.
MACHINE FOR TESTING THE STRENGTH OF METALS, &c.
No. 463,259. Patented Nov. 17, 1891.
5 Sheets—Sheet 4.
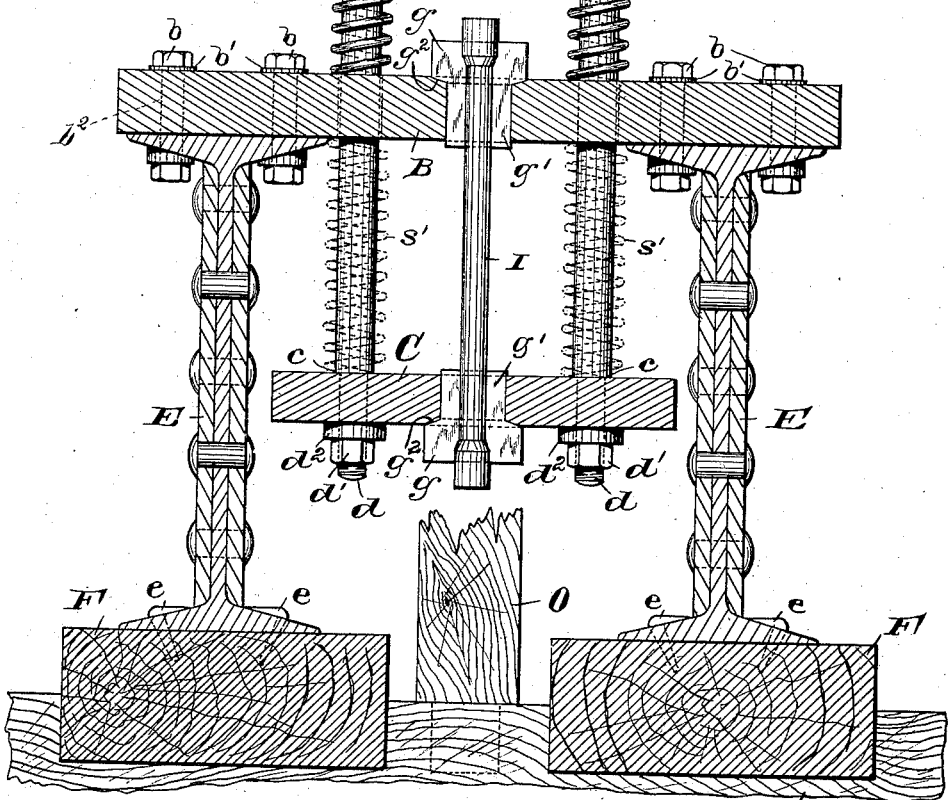
Fig. 7
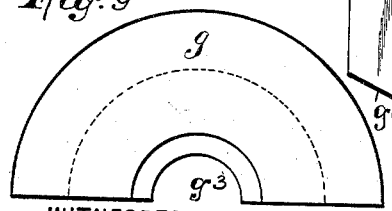
Fig. 9
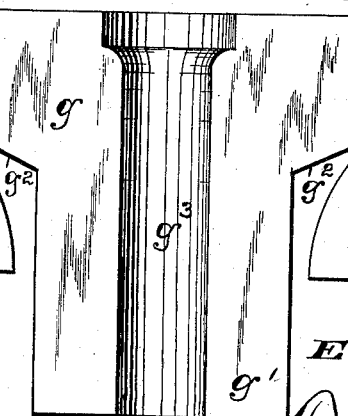
Fig. 8
Fig. 10
WITNESSES:
Wm. H. Canfield
Arthur Cresse
INVENTOR:
Esteban D. Estrada
BY Fred'k C. Fraentzel, ATT'Y.

(No Model.) 5 Sheets—Sheet 5.

E. D. ESTRADA.
MACHINE FOR TESTING THE STRENGTH OF METALS, &c.

No. 463,259. Patented Nov. 17, 1891.

WITNESSES:
Wm H. Camfield.
Arthur Cresse

INVENTOR:
Esteban D. Estrada,
BY Fredk C. Fraentzel, ATT'Y.

UNITED STATES PATENT OFFICE.

ESTEBAN D. ESTRADA, OF PITTSBURG, PENNSYLVANIA.

MACHINE FOR TESTING THE STRENGTH OF METALS, &c.

SPECIFICATION forming part of Letters Patent No. 463,259, dated November 17, 1891.

Application filed April 14, 1891. Serial No. 388,824. (No model.)

*To all whom it may concern:*

Be it known that I, ESTEBAN D. ESTRADA, a citizen of the United States, residing at Pittsburg, in the county of Allegheny and State of Pennsylvania, have invented certain new and useful Improvements in Testing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The primary purpose of the present invention herein specified is to provide a device or apparatus for determining the effect of suddenly-applied forces upon the tensile or compressive strength of metals, either simple or alloys, and other solid substances offering resistance to the action of external forces, either in the shape of specimens or in such shape as actually used in the mechanical arts, &c.—viz., wire rope, cables, chains, springs, links, hemp and jute ropes, stones, bricks, mortars, &c.

The form of construction selected to embody the invention in an operative machine or apparatus is illustrated in the accompanying five sheets of drawings, which show the novel arrangements and combinations of parts as will be hereinafter more fully specified, and finally embodied in the clauses of the claim.

There are many advantages derived from the invention sought to be protected hereby, and among them may be mentioned the ease and rapidity with which the parts of the apparatus and the test-pieces therein can be arranged, which is such as to transform the effect of a falling body upon a plate into a suddenly-applied tensile or compressed stress to the test-piece, either when the test-piece is without initial stress or when it is placed under such conditions by the insertion of springs or other suitable means exerting a pressure between the supports at the ends of the test-piece.

Figure 12:
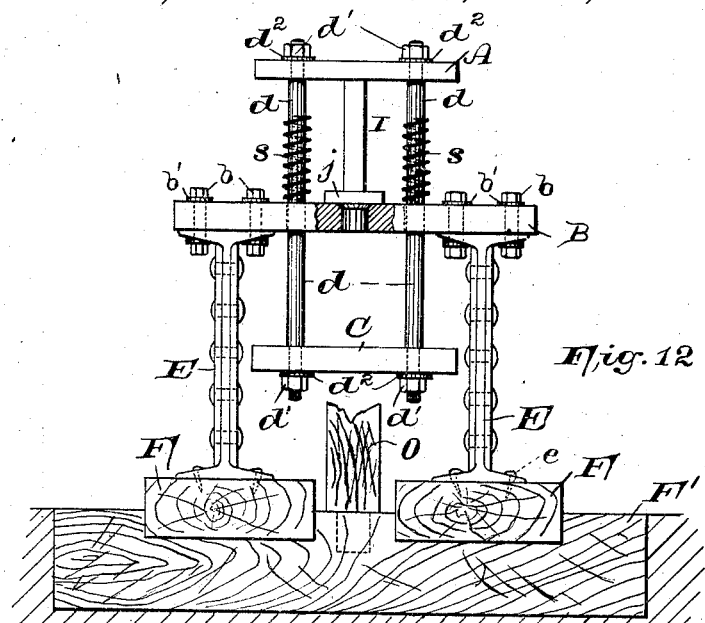

In said drawings, in which similar letters of reference are employed to indicate corresponding parts in each of the several views, Figure 1 is a side elevation of my improved testing-machine. Fig. 2 is a vertical section of the same, showing the hammer, block, and tackle for raising the same and its releasing mechanism in elevation, and clearly illustrating the manner of arranging or placing the test-piece in the machine. Fig. 3 is a front view of the apparatus. Fig. 4 is a horizontal section taken on line 4 4 in Fig. 1; and Figs. 5 and 6 are like sections taken on lines 5 5 and 6 6, respectively, in said Fig. 1. Fig. 7 is an enlarged vertical section of the lower supports of the apparatus and the supporting-plates between which the test-piece is arranged, the connecting-bolts in this instance being provided with helical springs, indicated in dotted outline, under which conditions by such insertion of the springs an initial pressure or stress is exerted between the supporting-plates and consequently upon the test-piece. Fig. 8 is a side view of one of the chucks for securing the test-piece; and Figs. 9 and 10 are plan views of the upper and lower end portions, respectively, of the chuck illustrated in said Fig. 8. In Fig. 11 is shown the supporting-plates having hook-supports for determining the tensile strength of a link or chain; and in Fig. 12 is shown still another use to which the apparatus can be put for determining the compressive strength of metal, stones, bricks, mortars, &c.

The machine or apparatus shown in full in Figs. 1, 2, and 3 is about thirty feet in height; but the height can be varied according to circumstances. The machine is constructed and arranged to place the test-piece between two adjustable supporting-plates to determine either the compressive or tensile strength of the test-piece, and to accomplish these results the machine or apparatus consists of two I-beams or built girders E, placed upon and permanently fixed by bolts or spikes $e$ to the foundation-blocks F F, arranged upon a foundation or support F'. Upon said I-beams or built girders E is secured, by means of a desirable number of suitable bolts $b$ and rubber washers $b'$, a plate B, said girders thereby acting as a firm support for said plate. Said plate B is provided with suitably-arranged holes or perforations $b^2$, preferably four in number, in which are arranged to freely move up and down through said holes equal bolts or rods $d$ of the requisite diameters to withstand the compressive strain exerted upon them by the falling of a hammer or weight H upon a plate A when operating the machine. Said bolts or rods $d$ are of smaller diameters at their opposite ends, which ends project through suitably-arranged holes $a$ in the plate A and holes $c$ in a plate C, which plates are thus held parallel to each other by said bolts $d$, and are secured in place by nuts $d'$ and rubber washers $d^2$ on the extremities of the bolts. The plates A and C are arranged on opposite sides of the fixed plate B, as will be evident from the several views of the drawings. Between said plates B and A and encircling each of said bolts $d$ are helical springs $s$, as clearly shown. The plate B and the plate C are each provided with a central perforation, in which I place chucks $g$, consisting of halves, said chucks being preferably constructed as shown more especially in Figs. 8, 9, and 10, the narrow and the long portion $g'$ of each chuck fitting in the central holes in the respective plates B and C and the chamfered shoulders $g^2$ of the chuck securely resting upon a similar shoulder in the perforations in said plates, and each chuck being provided with semicircular grooves $g^3$, as is clearly shown in the vertical section in Fig. 7.

As will be clearly seen from Figs. 1, 2, and 3, *et sequitur*, I have arranged on opposite sides of the foundation block or support F' two uprights or posts O O, which may be connected at the bottom by a suitable tie-bolt $o'$ and at the top by the stringer or cross-piece $o^2$. An eyebolt or hook $o^3$ is secured in said cross-piece and projects from the lower side thereof, from which can be suspended a suitable block and tackle T, to the lower block of which is secured in any manner a holding and at the same time a releasing device $t$ for holding or releasing a hammer or weight H, which runs in guides or ways $o$ on said supports, in the manner as will be described farther on, when it is desirable to test the specimen or metal arranged between the plates A and C of the apparatus.

I will first describe the manner of determining the tensile stress of a piece of metal or rope or cable, &c., by transforming the effect of a falling body upon the plate A into a suddenly-applied tensile stress when the piece is without initial stress, and also the manner of raising or lowering the suspended weight or hammer H.

When there is no test-piece in position between the plates A and B, the plate A naturally rests upon the springs $s$. The hammer H, which is provided with an eye $h$, which the clamp or tongs $t$ have grasped, as shown in Figs. 1, 2, and 3, the tongs being held in their locked engagement by the locking of the free end $t'$ with the hook $t^2$ on the lever $t^3$, provided with an eye or ring $t^4$, in which is secured a pull-rope $t^5$, and which grasping and releasing device is attached at an eye $t^6$ to the lower block, is raised to the proper height by a pull on the rope T', which is properly secured to prevent the hammer or "drop" from falling. In order to arrange the test-piece I, which in this case is a piece of turned metal or a rope or a cable, between the plates B and C, I raise the plate C upward and insert the test-piece in the perforations in the plates, and the chucks $g$ are placed around the test-piece, as shown. The plate C is then lowered, which causes the plate A to remain in the position indicated in the drawings, and in which position the hammer or drop is to fall upon said plate A. The hammer or drop H, which has been raised to the required height, which is indicated by a scale $o^4$ on one of the uprights O, is then allowed to fall upon the plate A by pulling upon the rope $t^5$, which tilts the lever $t^3$ and disengages the hook $t^2$ from the end $t'$ of the tongs, thereby causing the hammer or drop H to fall upon the plate A, when the tackle can again be lowered and the hammer raised and secured again to allow the continuation of the experiment, if necessary.

Under certain conditions it may be necessary to place the test-piece under an initial stress. One suitable means for accomplishing such conditions is illustrated in Fig. 7, in which case I insert springs $s'$ (shown in dotted outline) around the bolts or rods $d$, which springs thereby exert a pressure between the plates C and B. The initial stress upon the test-piece is determined by the amount of compression undergone by the springs between said plates C and B after the test-piece is in position and ready to be experimented upon in the manner just described.

When the test-piece I breaks, the plate A will fall and finally be supported by the springs $s$, which prevents any undue jarring of the plate B and its fixed supports, and the weight or drop H will remain on said plate, when the distance of its fall can be readily read from the scale $o^4$ on one of the supports.

The several parts of the machine are preferably made of wrought-iron, rolled or forged steel, in order to withstand the strains to which the parts are subjected in experimenting upon a test-piece.

When it is desirable to determine the tensile strength of a link or chain or a coiled spring, the ends of the test-piece are placed over hook-shaped ends on the chucks, as clearly shown in Fig. 11, when the operation of working the apparatus is the same as has just been described.

To find the compressive strength of a test-piece, I place a plate $j$ over the central hole in the plate B, and place the test-piece in an upright position thereon, as will be evident from Fig. 12. The hammer or drop is raised in the same manner as in the experiment for determining the tensile strength, and when it is dropped upon the plate A the test-piece, which is of a uniform length, becomes compressed, and the amount of compression can be easily calculated by noting the distance of the fall and the amount of compression of the test-piece.

I will not enter into a detailed description of how to determine the tensile or compressive strength of metals, &c., as the present apparatus is only for determining the strength of test-pieces which are of a given uniform size and length, from which, according to certain laws, the proportionate strength of larger bodies can be readily determined, as will be understood by those skilled in the art of testing metals.

By my improved form of apparatus I have provided a machine which can be readily handled and one for quickly determining the effects of suddenly-applied forces upon the tensile or compressive strengths of metals, either simple or alloys, or any other solid substances, such as wire rope, cables, chains, stones, bricks, &c.

Having thus described my invention, what I claim is—

1. In a machine for determining the tensile or compressive strength of metals, &c., the combination, with a stationary supporting-frame, as B, and adjustable supporting-plates on opposite sides of said supporting-frame for securing the test-piece in position and a connecting means between said adjustable plates, of a hammer or drop adapted to be raised, and means for releasing said hammer or drop, whereby the same suddenly falls upon the upper one of said supporting-plates and its suddenly-applied force acting upon the test-piece, substantially as and for the purposes set forth.

2. In a machine for determining the tensile or compressive strength of metals, &c., the combination of a foundation having I-beams or girders arranged thereon, a plate B, secured to said I-beams or girders, bolts or rods $d$, passing through said plates B, plates A and C, secured to the ends of said bolts on opposite sides of plate B, springs $s$, encircling said bolts $d$, chucks or holding devices arranged in central perforations in said plates B and C for supporting the test-piece therebetween, a hammer or drop adapted to be raised, and means for releasing said hammer or drop, whereby the same suddenly falls upon the upper plate A, secured to the bolts $d$, and its suddenly-applied force acts upon the test-piece, substantially as and for the purposes set forth.

3. The combination, in a testing-machine, of a stationary frame provided with a plate B, and the test-piece carriers or holding-plates on opposite sides thereof, a hammer or drop, a block and tackle suspended between two uprights, and means for securing said hammer to the block and tackle, consisting of two pivotally-secured tongs, one provided with an eye $t^6$ for securing it to the block and tackle, the other end $t'$ extending upwardly, and an arm $t^3$, provided with a hook end engaging with said end $t'$ to hold the tongs in their closed relation, but when released therefrom thereby releasing the hammer, whereby the same suddenly falls upon one of the test-piece carriers and its suddenly-applied force acts upon said test-piece, substantially as and for the purposes set forth.

4. The combination, in a testing-machine, of a stationary frame provided with a plate B and the test-piece carriers or holding-plates on opposite sides thereof, a hammer or drop, a block and tackle suspended between two uprights, and means for securing said hammer to the block and tackle, consisting, essentially, of two pivotally-secured tongs, one provided with an eye $t^6$ for securing it to the block and tackle, the other end $t'$ extending upwardly, and an arm $t^3$, provided with a hook end engaging with said end $t'$ to hold the tongs in their closed relation, but when released therefrom thereby releasing the hammer, whereby the same suddenly falls upon one of the test-piece carriers and its suddenly-applied force acts upon said test-piece, substantially as and for the purposes set forth.

5. In a testing-machine, a bed or frame, uprights mounted thereon, blocks F, girders or beams thereon, a plate B, secured on said girders, provided with a central perforation, bolts or rods passing through holes in said plate B, plates A and C, connected with said bolts, a central perforation in said plate C, chucks in said plates B and C for supporting the test-piece, springs encircling said bolts or rods $d$, a hammer or drop, a holding device $t$, secured to a block and tackle suspended between said uprights, and means for releasing said holding device $t$, whereby said hammer suddenly falls upon said upper plate A and its suddenly-applied force acts upon said test-piece, substantially as and for the purposes set forth.

6. In a testing-machine, a bed or frame, uprights mounted thereon, blocks F, girders or beams thereon, a plate B, secured on said girders, provided with a central perforation, bolts or rods passing through holes in said plate B, plates A and C, connected with said bolts, a central perforation in said plate C, chucks in said plates B and C for supporting the test-piece, springs encircling said bolts or rods $d$, a hammer or drop, a holding device $t$, secured to a block and tackle suspended between said uprights, and means for releasing said holding device $t$, whereby said hammer suddenly falls upon said upper plate A and its suddenly-applied force acts upon said test-piece, and a scale attached to one of said uprights, substantially as and for the purposes set forth.

7. In a testing-machine, the bed and a plate firmly secured thereto by means of girders, combined with adjustable and movable plates A and C, rods $d$, connecting said plates, adapted to move in perforations in said plate on the girders, springs encircling said rods and placed on top of said plate on the girders with which said plate A comes in contact, as set forth, and a hammer or drop adapted to be raised and lowered above said plate A, substantially as and for the purposes set forth.

8. In a testing-machine, the bed and two uprights mounted thereon, and a plate firmly secured to girders on said bed, combined with adjustable and movable plates A and C, rods *d*, connecting said plates, adapted to move in perforations in said plate on the girders, springs encircling said rods and placed on top of said plate on the girders with which said plate A comes in contact, as set forth, a hammer or drop adapted to be raised and lowered above said plate A, and a scale on one of said uprights, substantially as and for the purposes set forth.

9. In a testing-machine, the combination, with a test-piece, of a fixed support B, in which one end of said test-piece is arranged, and a movable plate C, in which the other end of said test-piece is arranged, rods extending up from said plate C and projecting through holes in said fixed support, and a plate A, connected with said rods, to which the strain is directly applied, as and for the purposes set forth.

In testimony that I claim the invention set forth above I have hereunto set my hand this 10th day of April, 1891.

ESTEBAN D. ESTRADA.

Witnesses:
J. A. WAKEFIELD,
J. W. KINNEAR.